United States Patent [19]

Naruse et al.

[11] 4,256,852
[45] Mar. 17, 1981

[54] BINDER COMPOSITION FOR MAGNETIC RECORDING TAPE

[75] Inventors: Tunehide Naruse; Ikuo Matsumoto, both of Yokohama, Japan

[73] Assignee: Victor Company of Japan, Ltd., Yokohama, Japan

[21] Appl. No.: 10,264

[22] Filed: Feb. 7, 1979

[30] Foreign Application Priority Data

Feb. 10, 1978 [JP] Japan ................................ 53/14773

[51] Int. Cl.$^3$ .......................... C08K 3/28; C08K 3/16; C08G 18/04; C08G 18/02
[52] U.S. Cl. ..................................... 525/6; 252/62.54; 427/127; 427/128; 427/129; 427/131; 427/132; 525/123; 525/125; 525/129
[58] Field of Search .................. 525/125, 6, 129, 123; 427/127, 128, 129, 131, 132; 252/62.54

[56] References Cited

U.S. PATENT DOCUMENTS

| | | | |
|---|---|---|---|
| 2,606,162 | 8/1952 | Coffey et al. | 525/129 |
| 2,893,969 | 7/1959 | Graham et al. | 525/129 |
| 3,144,352 | 8/1964 | Talley | 525/129 |
| 4,068,040 | 1/1978 | Yamada et al. | 427/128 |

*Primary Examiner*—William F. Hamrock
*Attorney, Agent, or Firm*—Lowe, King, Price & Becker

[57] ABSTRACT

A binder composition for magnetic recording tape which comprises polyisocyanate and a vinyl chloride-vinyl acetate copolymer non-reactive with the polyisocyanate, the copolymer being used in larger proportion. A resin or elastomer which is not reactive with the polyisocyanate may be added as a third component to impart flexibility or other desirable properties to the magnetic layer of tape.

3 Claims, 1 Drawing Figure

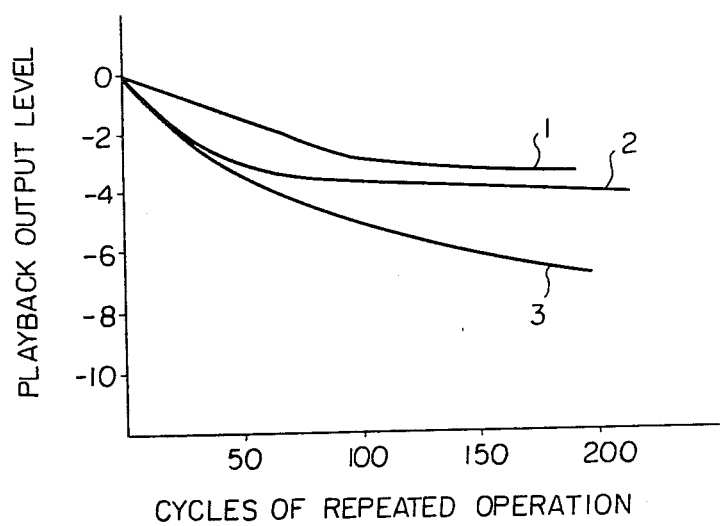

BINDER COMPOSITION FOR MAGNETIC RECORDING TAPE

This invention relates to a magnetic recording art and more particularly, to a binder composition for magnetic recording tape.

As is well known in the art, the magnetic recording tape is made by coating a base sheet such as plastic film with a magnetic composition, drying and surface calendering the coated sheet, and finally keeping it at a certain temperature for a time sufficient to cure the magnetic coating layer. It is also known that the physical and chemical properties of the magnetic recording tape are greatly influenced by the tape of the binder employed in the magnetic composition.

In general, the binder for the above purpose is composed of polyisocyanate and one or more other resinous materials. A large number of the resinous materials to be mixed with polyisocyanate are known and practically used including polyvinyl alcohol-containing vinyl chloride-vinyl acetate copolymers, polyurethane elastomers, polyesters, polyethers, polyols, phenoxy resins, etc. The reason why these elastomers or resins are widely used in combination with polyisocyanate is that the polyisocyanate is cross-linked and hardened by reaction of the NCO groups in the polyisocyanate molecules with the OH groups, COOH groups or $NH_2$ groups in the elastomers or resins. The binders of the just-mentioned type are accordingly excellent in heat and chemical resistances and mechanical strengths. Those binders have found application such as in magnetic video recording tapes and magnetic recording tapes for computer which are usually applied at high relative speed and also in magnetic cards requiring high abrasion resistance. However, these binders are disadvantageous in that when undergoing the urethanation reaction for the crosslinkage under heating conditions, the binder layer tends to shrink, presenting a serious problem such as of so-called cupping or curling.

It is accordingly an object of the present invention to provide a binder composition for magnetic recording tape which ensures excellent mechanical strengths and causes little or no cupping or curling of the tape.

It is another object of the present invention to provide a binder composition for magnetic recording tape whereby the tape is hardly lowered in playback output characteristics when repeatedly reproduced and rewound.

The above objects can be achieved by a binder composition which comprises a major proportion of a vinyl chloride-vinyl acetate copolymer which is free of functional groups reactive with polyisocyanate such as OH group, COOH group or $NH_2$ group and a minor proportion of polyisocyanate.

Preferably, the polyisocyanate is contained in an amount of 5-80 wt % of the copolymer.

The binder compositon may further comprise a resin or elastomer such as nitrile rubber which is not reactive with the polyisocyanate.

The present invention will be described in detail.

The polyisocyanate which is one component of the binder composition according to the invention may be any of usually employed ones including Coronate L ($C_{33}H_{33}O_9N_6$, reaction product of 3 moles of 2,4-tolylenediisocyanate and 1 mole of trimethylolpropane available from Nippon Polyurethane Co., Ltd.), 2,4-tolylenediisocyanate, 2,6-tolylenediisocyanate, hexamethylenediisocyanate, a reaction product of 3 moles of hexamethylenediisocyanate and 1 mole of trimethylolpropane, and the like isocyanate. As described above, the polyisocyanate is generally used in minor proportion and is preferred to be used in an amount of 5-80 wt % based on the vinyl chloride-vinyl acetate copolymer. Much larger amount if unfavorable since the binder layer loses its flexibility.

The vinyl chloride-vinyl acetate copolymer useful for the purpose of the invention is one which has a degree of polymerization of 300 to 500 and a vinyl acetate content of 3 wt % to 15 wt %.

In practice, these binder components are mixed, in solvent, with a magnetic powder such as $\gamma$—$Fe_2O_3$, Co—$Fe_2O_3$, Co—$Fe_3O_4$ or the like, a lubricant, a dispersant and other additives to give a magnetic composition. In the preparation of the magnetic composition, it is not necessarily required to add the two binder components at the same time. For instance, the vinyl chloride-vinyl acetate copolymer, magnetic powder and other additives may be first mixed in an organic solvent, to which the polyisocyanate is then added to give a magnetic composition as will be seen from Examples appearing hereinlater. The magnetic composition can be applied to a base sheet or film by any of known techniques.

In the binder system according to the invention, only the polyisocyanate takes part in the crosslinking reaction where the isocyanate groups in the polyisocyanate react with moisture in air. In other words, the polyisocyanate is not crosslinked nor hardened by reaction with the other binder component as is experienced in known binder systems. This is why the combination of the polyisocyanate and the vinyl chloride-vinyl acetate copolymer non-reactive with the polyisocyanate does not cause any problem of cupping or curling when applied as a binder for magnetic recording tape. In addition, the magnetic layer using the binder system of the invention is excellent in mechanical strength and is not lowered in playback output characteristics even when the tape is subjected to repeated cycles of reproduction and rewinding operation.

In order to improve the flexibility or other desirable properties of the magnetic layer, the binder system may further comprise, as a third component, a resin or elastomer which does no react with the polyisocyanate. A typical example of the resin which is not reactive with the polyisocyanate is nitrile rubber. The third component resin may be used in an amount of up to 50 wt % based on the total amount of the vinyl chloride-vinyl acetate copolymer and the third component resin.

The present invention will be particularly illustrated by way of the following examples and comparative examples.

EXAMPLE 1

A mixture of 100 parts by weight of $\gamma$—$Fe_2O_3$ as a magnetic powder, 112 parts by weight of a lubricant, 2 parts by weight of carbon powder, 1 part by weight of a dispersant, 230 parts by weight of a mixed solvent of methyl ethyl ketone, toluene and methyl isobutyl ketone in equal amounts, and 22 parts by weight of vinyl chloride-vinyl acetate copolymer VYHH (product of U. C. Co., with a degree of polymerization of about 450, a random structure and a vinyl acetate content of about 14%) was placed in a sand mill and mixed and dispersed sufficiently. Thereafter, a mixture of 2.2 parts by weight of Coronate L ($C_{33}H_{33}O_9N_6$, product of Nippon Polyurethane Co.) as a polyisocyanate and 5 parts by weight of a solvent of the same type as used above was added to and mixed well with the dispersion. The resulting mixture was applied onto a 15μ thick polyester film and subjected to a surface calendering treatment. The thus treated film was then maintained at 60° C. for 24 hours for curing. Finally, the film was cut lengthwise into tapes of a predetermined width.

The binder in this example was found to be of a rather hard type.

EXAMPLE 2

Example 1 was repeated using, instead of 22 parts by weight of the vinyl chloride-vinyl acetate copolymer VYHH, 18 parts by weight of the copolymer VYHH and 4 parts by weight of nitrile rubber (Hycar, product of Nippon Zeon Co.) thereby giving a magnetic video recording tape.

The binder in this example was found to be more flexible than that of Example 1.

EXAMPLE 3

Example 1 was repeated using magnetic $Co-Fe_3O_4$ powder instead of $\gamma-Fe_2O_3$, thereby obtaining a magnetic video recording tape.

EXAMPLE 4

Example 1 was repeated using magnetic $Co-Fe_2O_3$ powder instead of $\gamma-Fe_2O_3$, thereby obtaining a magnetic video recording tape.

In the above examples, Coronate L was used as polyisocyanate and similar results were obtained when there were used, instead of the Coronate L, 2, 4-tolylenediisocyanate, 2, 6-tolylenediisocyanate, hexamethylenediisocyanate and a reaction product of 3 moles of hexamethylenediisocyanate and 1 mole of trimethylolpropane, respectively.

COMPARATIVE EXAMPLE 1

Example 1 was repeated using a 6 % polyvinyl alcoholcontaining vinyl chloride-vinyl acetate copolymer VAGH (product of U. C. CO.), thereby obtaining a magnetic video recording tape.

COMPARATIVE EXAMPLE 2

Example 1 was repeated except that the vinyl chloride-vinyl acetate copolymer VYHH alone was used as a binder, thereby obtaining a magnetic video recording tape.

COMPARATIVE EXAMPLE 3

Example 1 was repeated except that the polyisocyanate alone used in Example 1 was employed as a binder, thereby obtaining a magnetic video recording tape.

Visual observations of the respective tapes obtained in the above-described Examples and Comparative Examples revealed that the tapes of Examples 1-4 had no defect in outer appearance but the tape of Comparative Example 1 suffered from curling and cupping defects.

Further, the tapes were each mounted in a magnetic recording and reproducing apparatus to check the mechanical strength of the magnetic binder layer. The apparatus used was of the open reel type which was operated at a tape feed speed of 10.8 m/sec. relative to the head and a drum diameter of about 116 mm. The test was conducted as follows: Each tape was repeatedly reproduced and rewound under conditions of a temperature of 40° C. and a relative humidity of 80 % to check a lowering of playback output characteristics and a degree of abrasive scratches on the tape surface.

When the tapes were each subjected to repeated cycles of the operation two hundreds times, the degree of scratch was found to be slight for the tapes of Examples 1, 3 and 4, nil for that of Example 2, and heavy for that of Comparative Example 1.

The degree of scratch is believed to depend on the hardness of the binder.

As for the lowering of the playback output characteristics, all the tapes were found to be substantially in the same level up to 50 cycles of the operation as will be seen from the accompanying sole FIGURE in which indicated as 1 is a curve for the magnetic video recording tapes of Examples 1, 3 and 4, as 2 is a curve for the tape of Example 2, and as 3 is a curve for the tape of Comparative Example 1. However, the tape of Comparative Example 1 was sharply lowered in the output characteristics over 100 cycles of the operation as seen from the FIGURE. Further, the playback output of the tape of Comparative Example 2 was found to be lowered to such a low level of −6 dB in about 30 cycles of the operation. In case of the tape of Comparative Example 3, the playback output was lowered to a considerable extent only by one cycle operation.

What is claimed is:

1. A binder composition for magnetic recording tape which ensures excellent mechanical strengths and causes little or no cupping or curling of the tape, said binder composition consisting essentially of (a) a major proportion of a vinyl chloride-vinyl acetate copolymer having a degree of polymerization of 300 to 500 and a vinyl acetate content of 3 wt.% to 15 wt.%; (b) a polyisocyanate in an amount of 5 to 80% by weight of the copolymer; and (c) a third component resin in an amount ranging from 0 up to 50 wt.% based on the total amount of said copolymer and said third component resin;

said copolymer and said third component resin being non-reactive with the polyisocyanate whereby only the polyisocyanate takes part in a crosslinking reaction in which the isocyanate groups of the polyisocyanate react with moisture in air.

2. A binder composition according to claim 1, wherein said polyisocyanate is a member selected from the group consisting of a reaction product of 3 moles of 2, 4-tolylenediisocyanate and 1 mole of 2, 4-tolylelenediisocyanate, 2, 6-tolylenediisocyanate, hexamethylenediisocyanate and a reaction product of 3 moles of hexamethylenediisocyanate and 1 mole of trimethylolpropane.

3. A binder composition according to claim 1, wherein said third component resin is nitrile rubber.

* * * * *